United States Patent [19]
Miyake et al.

[11] Patent Number: 5,515,354
[45] Date of Patent: May 7, 1996

[54] OPTICAL PICKUP

[75] Inventors: Takahiro Miyake, Soraku; Yoshio Yoshida, Nara; Yukio Kurata, Tenri, all of Japan

[73] Assignee: Sharp Kabushiki Kaisha, Osaka, Japan

[21] Appl. No.: 363,227

[22] Filed: Dec. 22, 1994

[30] Foreign Application Priority Data

Dec. 24, 1993 [JP] Japan ..................... 5-327856

[51] Int. Cl.⁶ ..................................... G11B 7/00
[52] U.S. Cl. ................ 369/112; 369/103; 369/109; 369/44.14; 369/44.37
[58] Field of Search ..................... 369/103, 109, 369/111, 112, 44.12, 44.13, 44.37, 44.14

[56] References Cited

U.S. PATENT DOCUMENTS

| | | | |
|---|---|---|---|
| 4,826,270 | 5/1984 | Opheij et al. | 369/109 |
| 4,918,679 | 4/1990 | Opheij et al. | 369/112 |
| 5,283,771 | 2/1994 | Kadowaki et al. | 369/44.14 |
| 5,301,182 | 4/1994 | Komma et al. | 369/103 |
| 5,400,311 | 3/1995 | Komma et al. | 369/103 |

FOREIGN PATENT DOCUMENTS 2-71442  3/1990  Japan .

*Primary Examiner*—Loha Ben
*Attorney, Agent, or Firm*—Morrison and Foerster

[57] ABSTRACT

The optical pickup of the invention includes a hologram mirror for directing an optical axis of a light beam emitted from a light source to be perpendicular to the recording face of a recording medium. The hologram mirror includes: a light transmissive substrate having a first surface and a second surface which are opposite to each other, the light beam from the light source entering the substrate from the first surface; a transmissive holographic element, formed on the first substrate, for diffracting the light beam incident thereon to generate a plurality of diffracted beams; and a reflective film, formed on the second surface of the substrate, for reflecting the diffracted beams, wherein the holographic element includes a blazed grating which is designed to make a predetermined one of the diffracted beams most intense.

11 Claims, 12 Drawing Sheets

OPTICAL PICKUP

BACKGROUND OF THE INVENTION

1. Field of the Invention

The present invention relates to an optical pickup for optically recording information on the recording surface of a recording medium such as an optical disk by focusing laser light onto the recording surface, and/or for playing back the information written (recorded) on the recording surface by detecting light reflected at the recording surface of the recording medium. More particularly, the invention relates to a thin optical pickup having a hologram mirror for redirecting the optical axis of incident light from a light source so that it is perpendicular to the recording surface of a recording medium.

2. Description of the Related Art

In recent years, use of optical disks having high packing densities and capable of storing large volumes of information has been spreading in a variety of fields. Because of its ability to record and play back information in non-contacting manner, coupled with the compatibility of the medium, the optical disk is particularly promising as an optical file storage or external storage medium for a computer.

Information is recorded on or played back from such optical disks by means of an optical pickup using laser light. Depending on the type of medium, recorded information can be erased or overwritten. For optical pickups for this type of medium, reducing the size and weight of optical pickups has been a major problem in achieving high access speeds.

Conventional optical pickups that address this problem include the ones disclosed in Japanese Laid-Open Patent Publication No. 2-71442 and U.S. Pat. No. 4,918,679. In either example, size and weight reductions are achieved by reducing the height of the optical pickup by using a hologram mirror.

FIG. 12A shows a conventional optical pickup using a hologram mirror. A laser beam emitted from a laser diode not shown is collimated by a collimator lens 6. The collimated beam x is directed to a hologram mirror 7. The light incident on the hologram mirror 7 is diffracted by the reflective holographic optical element 7a formed on the incident surface of the hologram mirror 7, and among diffracted light +1st order diffracted light is directed in the direction perpendicular to the surface of a disk 10. Then, light from the hologram mirror 7 is converged by an objective lens 9 onto the surface (recording face) of the disk 10.

FIG. 12B is a cross-sectional view showing a structural example of the hologram mirror 7. The reflective holographic optical element 7a formed on the incident surface of the hologram mirror 7 is a grating of straight lines formed at pitch d, and has a sawtooth-like cross section. The holographic optical element 7a, with sawtooth-like grooves formed at pitch d on the substrate surface of the hologram mirror, is coated with a reflective film 18. Using the hologram mirror 7 of such a structure, the overall thickness of the optical pickup measured in the direction perpendicular to the disk is reduced, compared with an optical pickup that uses a mirror the face of which is tilted with respect to the optical axis of light by 45 degrees (hereinafter, referred to as 45-degree tilted mirror). The height of the optical pickup can thus be reduced.

In the conventional hologram mirror 7 having the structure shown in FIG. 12B, the first-order light diffraction efficiency of the reflective holographic optical element 7a is dependent on the groove shape of the holographic optical element 7a on the light incident side. In the conventional structure, since the grooves are covered with the reflective film 18, not only the effective groove depth of the holographic optical element 7a is reduced, but the groove shape is also rounded, as shown in FIG. 12B. Consequently, it has been difficult to obtain the desired diffraction efficiency. Furthermore, since minimizing the ill effect of the reflective film on the groove shape demands a very sophisticated film deposition technique, formation of the reflective film has involved an extremely difficult technology, which has been a bottleneck in increasing the productivity of optical pickups.

Furthermore, the reflective film surface may be partially deteriorated, deformed, or degraded with time. Such phenomena produce effects equivalent to causing the groove shape to change. Accordingly, there has been a fear that the diffraction efficiency may degrade or unwanted higher-order diffracted light may occur as a result of the reflective film's deterioration with time.

SUMMARY OF THE INVENTION

The optical pickup of this invention includes a hologram mirror for directing an optical axis of a light beam emitted from a light source to be perpendicular to a recording face of a recording medium, the hologram mirror including: a light transmissive substrate having a first surface and a second surface which are opposite to each other, the light beam from the light source entering the substrate from the first surface; a transmissive holographic element, formed on the first surface, for diffracting the light beam incident thereon to generate a plurality of diffracted beams; and a reflective film, formed on the second surface of the substrate, for reflecting the diffracted beams, wherein the holographic element includes a blazed grating which is designed to make a predetermined one of the diffracted beams most intense.

In one embodiment of the invention, the predetermined one of the diffracted beams reflected by the reflective film is diffracted by the blazed grating to be directed in a direction perpendicular to the recording face of the recording medium.

According to another aspect of the invention, an optical pickup including a hologram mirror for directing an optical axis of a light beam emitted from a light source to be perpendicular to a recording face of a recording medium is provided. The hologram mirror includes: a light transmissive substrate having a first surface and a second surface which are opposite to each other, the light beam from the light source entering the substrate from the first surface; a holographic element, formed on the second surface, for diffracting the light beam which is transmitted from the first surface and is incident thereon to generate a plurality of diffracted beams; and a reflective film formed on the holographic element, wherein the holographic element includes a blazed grating which is designed to make a predetermined one of the diffracted beams most intense.

In one embodiment of the invention, the blazed grating has a pattern for correcting astigmatism contained in the light beam.

In another embodiment of the invention, the blazed grating is a grating of substantially straight lines.

In another embodiment of the invention, a grating pitch of a blazed grating is gradually varied.

In another embodiment of the invention, the predetermined one of the diffracted beams is the +1st order diffracted beam.

Thus, the invention described herein makes possible the advantage of providing an optical pickup including the hologram mirror in which the groove shape of the holographic optical element is unaffected by the presence of the reflective film, and which is easy to manufacture and yet capable of providing high performance for an extended period of time.

This and other advantages of the present invention will become apparent to those skilled in the art upon reading and understanding the following detailed description with reference to the accompanying figures.

DESCRIPTION OF THE PREFERRED EMBODIMENTS

The preferred embodiments of the invention will now be described with reference to the accompanying drawings.

Embodiment 1

Figure 1:
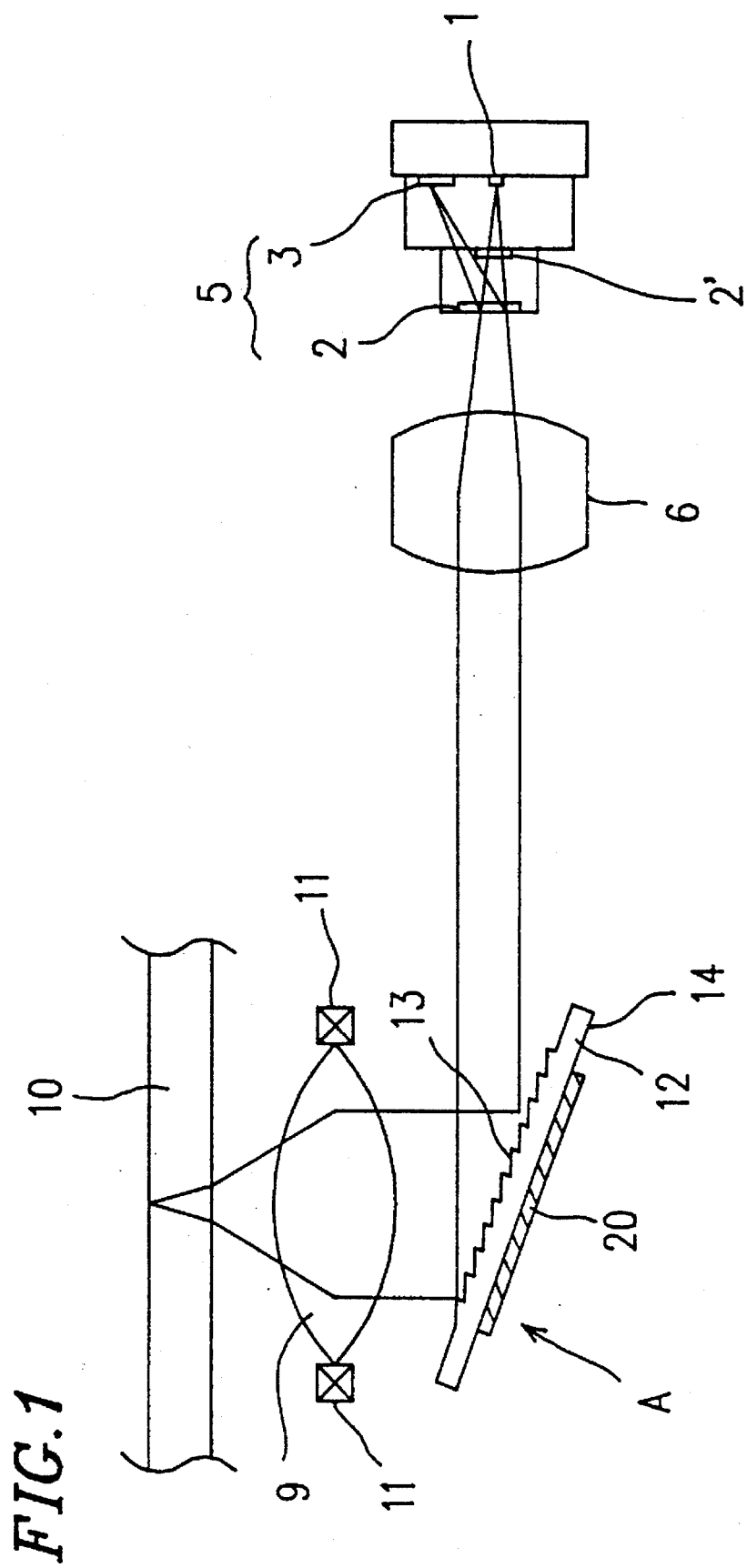
FIG. 1 is a schematic diagram showing the optical arrangement of an optical pickup according to a first embodiment of the invention.

FIG. 1 is a schematic diagram showing the construction of an optical pickup according to a first embodiment of the present invention. The optical pickup comprises a holographic optical element-laser diode-photodetector (HOE-LD-PD) unit 5 in which a laser diode 1 as a light source, a photodetector 3 for detecting reflected light from a disk (optical disk) 10, etc. are fabricated as a single unit. A light beam emitted from the laser diode 1 in the HOE-LD-PD unit 5 is passed through holographic optical elements 2' and 2, collimated by a mirror collimator lens 6, and directed to a hologram mirror 12 which is placed forward of the collimator lens 6.

The hologram mirror 12 enlarges the beam diameter of the light beam incident from the collimator lens 6, while deflecting the beam in a direction perpendicular to the surface of the disk 10. The thus deflected light beam is converged by an objective lens 9, forming a light spot on the recording surface of the disk 10.

The light beam reflected from the surface of the disk 10 is directed back to the holographic optical element 2 in the HOE-LD-PD unit 5 by taking the same path it entered but in the opposite direction. The holographic optical element 2 diffracts the incident light, of which the first-order diffracted light beams are directed to the photodetector 3. From these diffracted light beams, the photodetector 3 detects a focus error signal (FES), a radial error signal (RES), and an information signal. Based on the detected focus error signal (FES) and radial error signal (RES), focus servo control and tracking servo control are performed by moving the objective lens 9 in focusing directions and in radial directions using an actuator 11.

Figure 2:
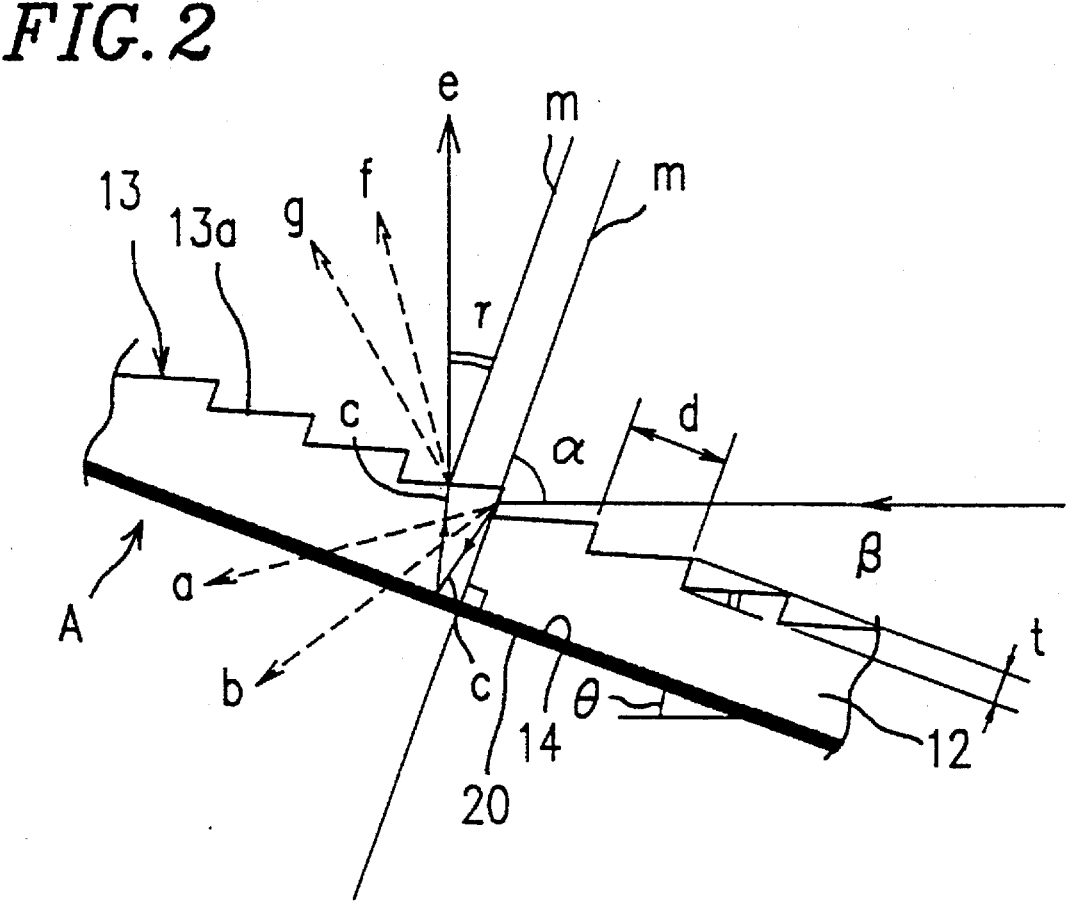
FIG. 2 is a cross-sectional view showing in detail a hologram mirror used in the optical pickup of FIG. 1.

FIG. 2 shows a cross section of the hologram mirror 12. The hologram mirror 12 includes a light transmissive substrate A having two opposite surfaces. The substrate A is formed from a transparent substrate such as a glass substrate. The substrate A is tilted at an angle of 8 with respect to the optical axis of the incident beam, i.e., the light beam from the collimator lens 6. The incident surface of the substrate A, that is, the front surface 13, has a transmissive holographic optical element 13a formed thereon, while the opposite surface thereof, that is, the back surface 14, is coated with a reflective film 20. The holographic optical element 13a comprises a blazed grating having a pitch d. The reflective film 20 is formed from a known metal film (including a multilayer film) such as Au and Al having high reflectivity.

The transmissive holographic optical element 13a formed on the front surface 13 consists of grooves having a sawtooth-like cross section with groove tilt angle β and groove depth t. The groove tilt angle β and groove depth t are determined so that when a beam of wavelength λ is incident thereon at an angle α with respect to the normal m of the holographic optical element 13a, as shown in FIG. 2, among the primary diffracted light beams, i.e., −1st order diffracted light beam a, 0th order diffracted light beam b, and +1st order diffracted light beam c, the +1st order diffracted light beam c is most intense.

The +1st order diffracted light beam c from the holographic optical element 13a undergoes total reflection at the back surface 14, and is again diffracted by the front surface 13. At this time also, among its primary diffracted beams, i.e., the −1st order diffracted light beam g, 0th order diffracted light beam f, and the +1st order diffracted light beam e, the +1st order diffracted light beam e is most intense. The +1st order diffracted light beam e emerges at an angle γ with respect to the normal m and enters the objective lens 9.

The optimum values of the groove tilt angle β and groove depth t of the holographic optical element 13a are determined in the following way. When the wavelength of the laser diode 1 is assumed to be λ, and the refractive index of the substrate A is assumed to be n, the +1st order diffracted light beam c is most intense when the groove depth t satisfies the following equation (1).

$$t = \lambda/2(n-1) \qquad (1)$$

At this time, the groove tilt angle β is expressed as $\tan^{-1}(t/d)$.

In the hologram mirror 12 of the above construction, since the reflective film 20 is formed on the back surface 14 of the substrate A, i.e., the surface opposite from the holographic optical element 13a, the groove shape of the holographic element 13a is unaffected by the presence of the reflective film 20. Furthermore, deterioration or deformation of the surface of the reflective film 20 will have no effect on the back surface 14 at which light is reflected. This makes the fabrication of the reflective film 20 easier since the dimensional accuracy of the reflective film 20 is eased.

Moreover, compared with a 45-degree tilted mirror, the thickness of the hologram mirror 12 measured in the direction perpendicular to the optical disk 10 can be reduced by a factor corresponding to sin γ because of its geometry. Using the angle of incidence α, the angle of emergence γ, and the grating pitch d, sin γ can be expressed by the following equation (2).

$$\sin\gamma = \sin\alpha - 2\lambda/d \tag{2}$$

As described above, in the hologram mirror 12 of the present invention, since the incident light beam is diffracted twice to change its direction by the same holographic optical element 13a, the diffraction angle per diffraction can be made smaller than in the conventional hologram mirror. This facilitates the fabrication of the holographic optical element 13a since the grating pitch of the holographic optical element 13a can be increased.

Figure 3A:
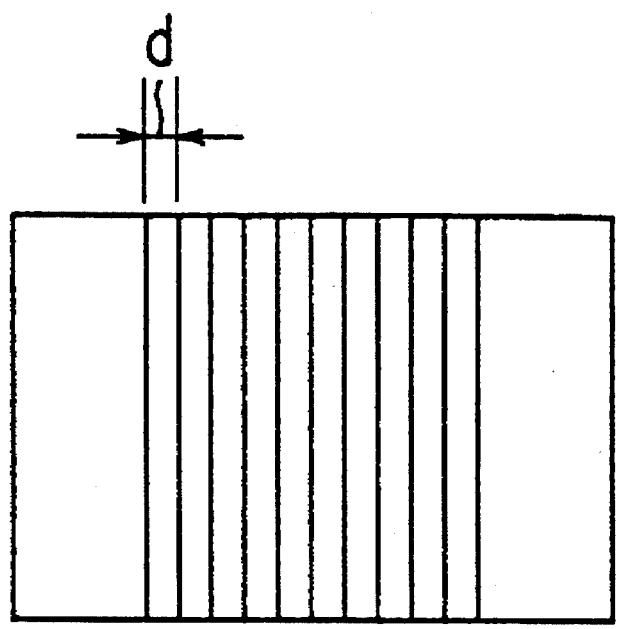
FIGS. 3A and 3B are schematic diagrams showing examples of hologram patterns for the holographic optical element.

The holographic optical element 13a of the present embodiment can be fabricated using one of the following methods. One method involves transferring a hologram pattern of a grating of straight lines with pitch d, such as shown in FIG. 3A, onto the surface 13 of the light transmissive substrate A, such as a glass substrate, and then carrying out oblique incident ion beam blaze etching on the transferred hologram pattern. Another method is to directly form a hologram pattern, similar to the one described above, by scribing the surface of the substrate A.

Figure 4:
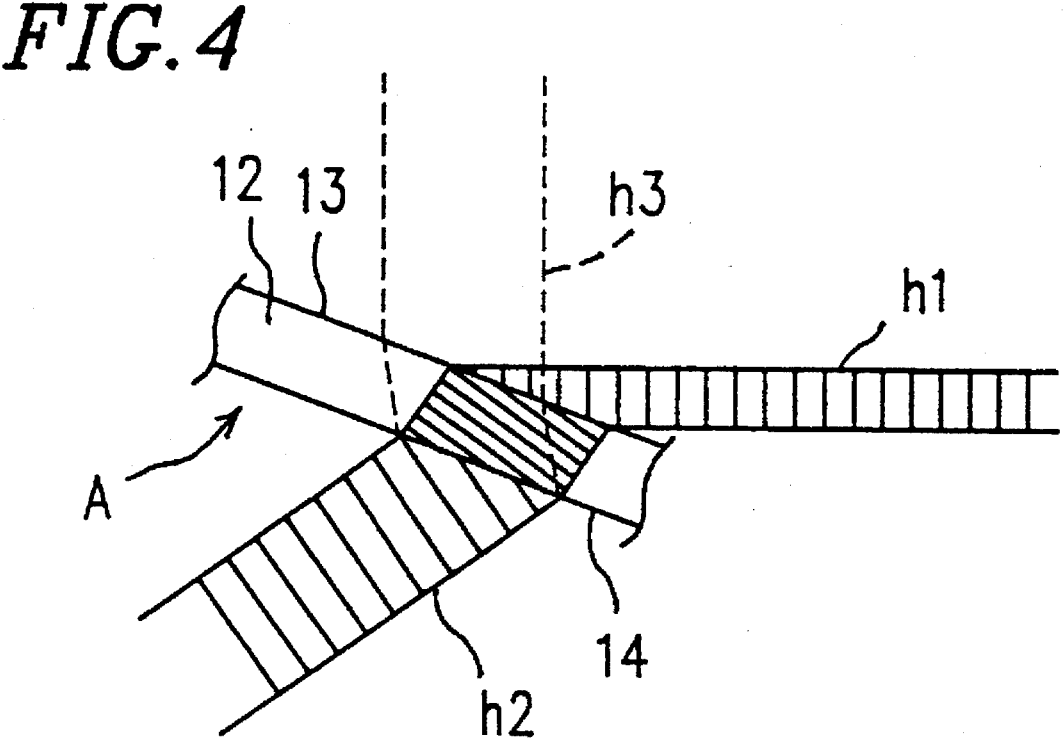
FIG. 4 is a schematic diagram for explaining a method of fabrication for the holographic optical element.

The hologram pattern shown in FIG. 3A is designed using a two beam interference method. In this method, as shown in FIG. 4, collimated light beam $h_1$ incident on the hologram mirror 12 from the laser diode 1 and collimated light beam $h_2$ which is equivalent to the collimated light beam $h_3$ from the objective lens reflected from the back surface 14 and reaching the front surface 13 of the substrate A are made to interfere with each other at the front surface 13 of the substrate A, thus forming an interference pattern. Alternatively, the hologram pattern may also be designed using a well known technique, such as a computer hologram.

Figure 3B:
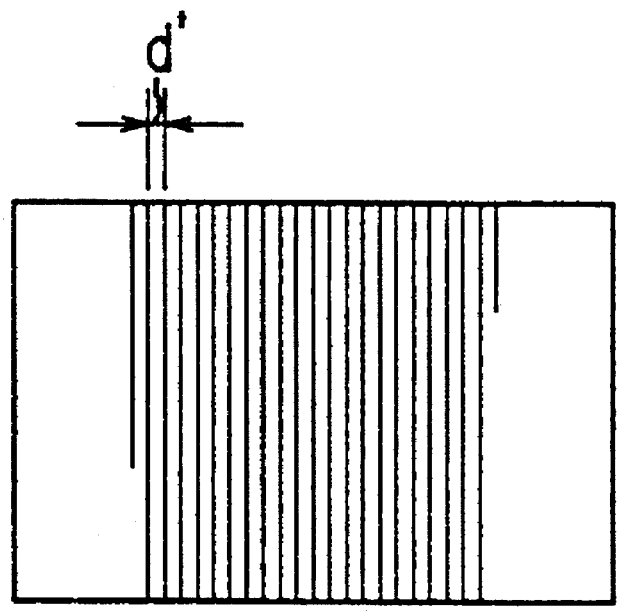

The collimated light beam $h_1$ may contain astigmatism components of the laser diode 1. In that case, it is desirable that the hologram pattern be formed with substantially straight lines arranged at pitch d' so as to correct the astigmatism, as shown in FIG. 3B. This provides better beam focusing on the disk 10, ensuring good recording and playback of information.

Next, a specific numerical example of the first embodiment will be described. The following description assumes the arrangement wherein the angle obtained by adding the angle of incidence on the hologram mirror 12 to the angle of emergence from the hologram mirror 12 is 90 degrees.

Assuming that the wavelength of a light beam emitted from the laser diode 1 is 0.78 μm, and the ellipticity of the light beam collimated by the collimator lens 6 is 1:3, if the light beam is to be shaped by enlarging its cross-sectional light intensity distribution into a circular form, the beam shaping rate at the hologram mirror 12 needs to be a factor of 3. As a result, the tilt angle θ of the hologram mirror 12 with respect to the axis of the incident light is $$\theta = \tan^{-1}(1/3) = 18.4 \text{ degrees.}$$

From this, the angle of incidence α is 71.6 degrees (90−18.4 degrees), and since α+γ=90 degrees, the angle of emergence γ is 18.4 degrees. Thus, from Equation (2), the grating pitch d is 2.46 μm. As is apparent from this specific value, the grating pitch d is relatively large and therefore it is easy to fabricate a blazed grating used as the holographic element 13a.

Figure 12A:
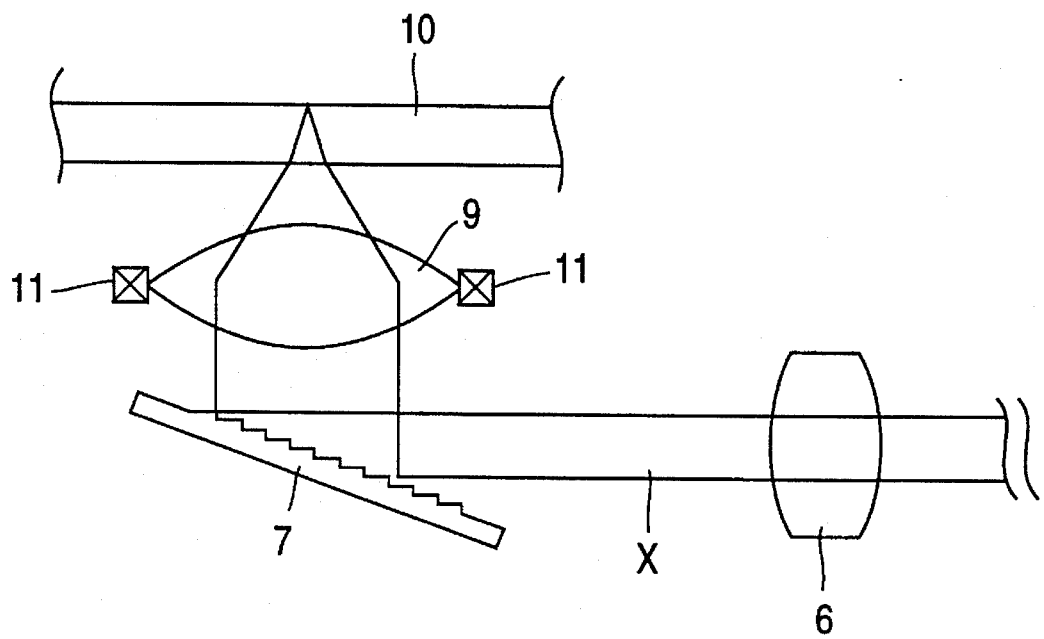
FIG. 12A is a schematic diagram showing the optical arrangement of a conventional optical pickup.
Figure 12B:
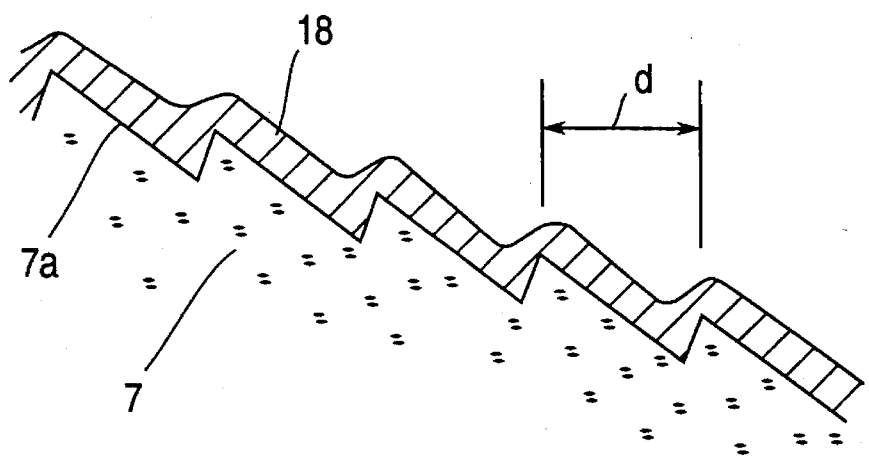
FIG. 12B is a cross sectional view of the hologram mirror used in the conventional optical pickup of FIG. 12A.

For comparison purposes, consider the situation where the light beam from the laser diode 1 is incident on the hologram mirror 7a in the conventional optical pickup shown in FIG. 12A with the same conditions as described above. In this case, the angle of incidence and the angle of emergence of the light beam on the hologram mirror 7a are 71.6 and 18.4 degrees, respectively, these values being the same as those in the above example. However, with the hologram mirror 7a in FIG. 12A, the light beam is diffracted only once, which requires that the grating pitch be 1.23 μm. As described, according to the present embodiment, the grating pitch of the holographic optical element 13a of the hologram mirror 12 can be made larger than that of the conventional hologram mirror.

Furthermore, compared with a 45-degree tilted mirror, the thickness of the hologram mirror 12 of the present embodiment measured in the direction perpendicular to the disk 10 is reduced to one-third or less since sin (18.4°)=0.316.

Figure 5:
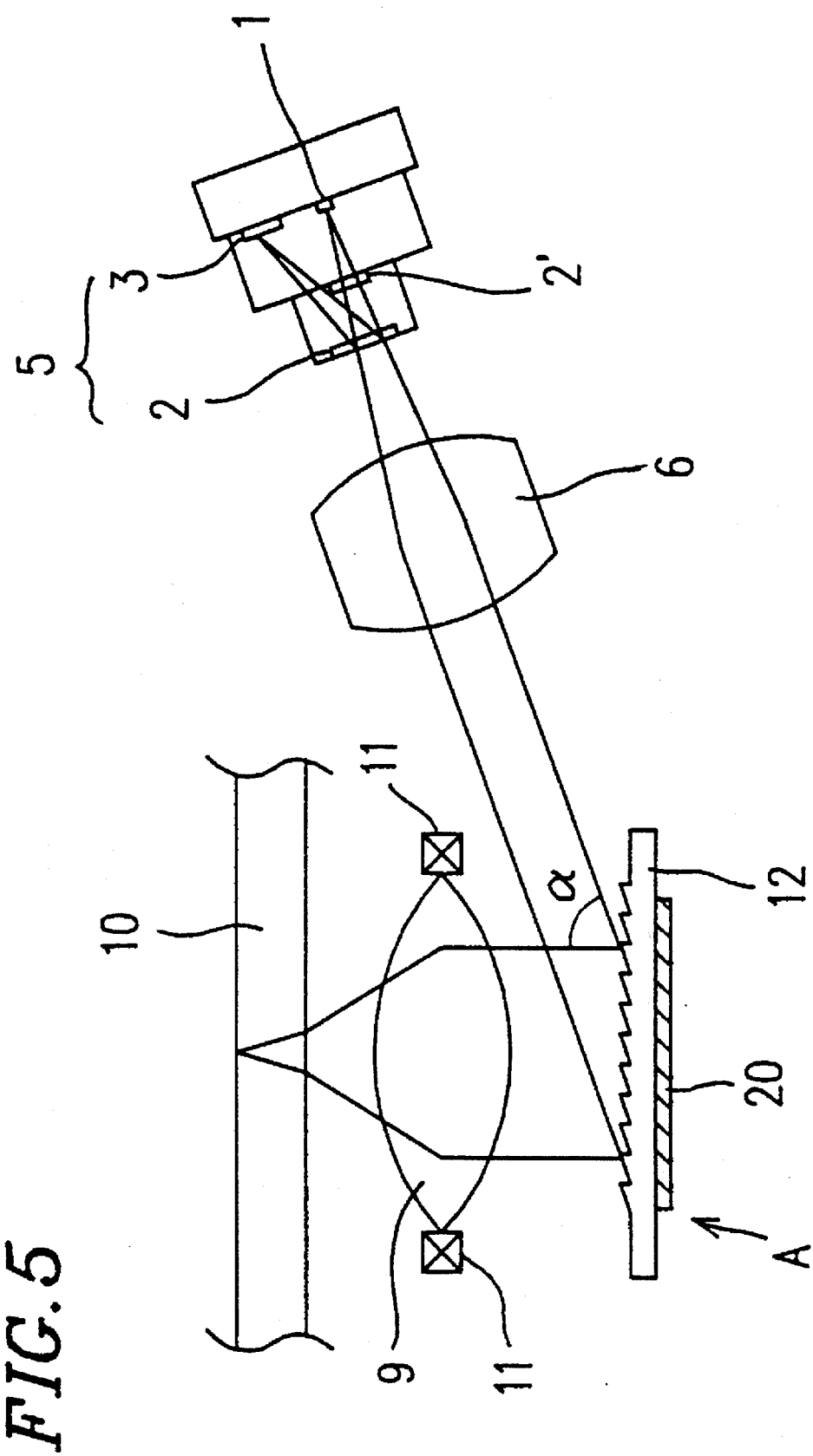
FIG. 5 is a schematic diagram showing a modified example of the optical arrangement according to the first embodiment.

As another specific numerical example of the first embodiment, consider the arrangement shown in FIG. 5 where the hologram mirror 12 is arranged in such a manner that the substrate A thereof is parallel to the disk 10.

Assuming that the ellipticity of the light beam collimated by the collimator lens 6 is 1:3, if the light beam is to be shaped by enlarging its cross-sectional light intensity distribution into a circular form, as in the first numerical example, the beam shaping rate at the hologram mirror 12 needs to be a factor of 3. Therefore, in this example also, the angle of incidence α from the light source is 71.6 degrees. In this example, since the angle of emergence γ is 0, the grating pitch d is, from Equation (2), 1.64 μm.

Figure 6:
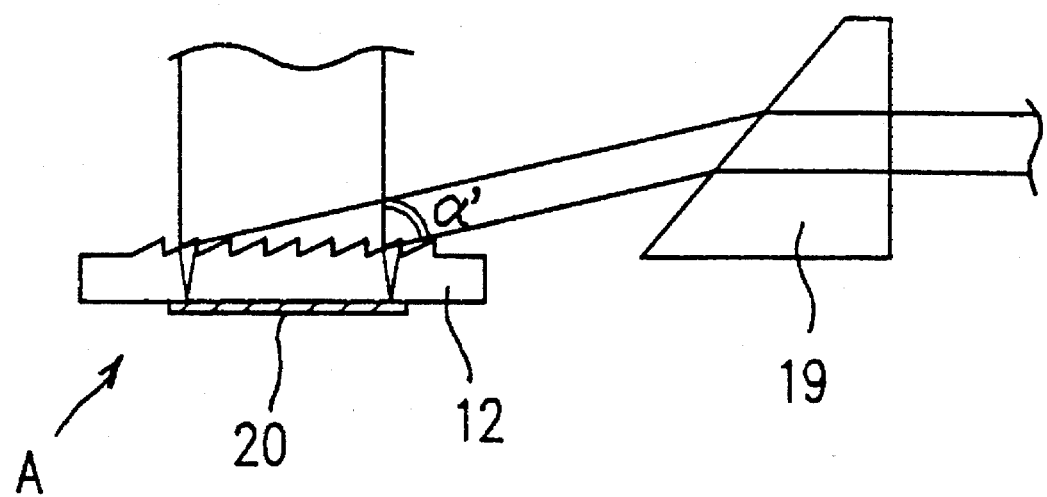
FIG. 6 is a schematic diagram showing another modified example of the optical arrangement according to the first embodiment.

In FIG. 5, to provide the angle of incidence α, the HOE-LD-PD unit 5 and the collimator lens 6 are arranged in such a way that the direction and optical axis of the emergent light beam is at an angle with respect to the surface of the disk 10. However, if a prism 19 is placed between the hologram mirror 12 and the collimator lens 6, as shown in FIG. 6, the HOE-LD-PD unit 5 and the collimator lens 6, as well as the hologram mirror 12, can be arranged in such a manner that the direction and optical axis of the emergent light beam is parallel to the surface of the disk 10.

In that case, however, considering that the prism 19 has a beam shaping function, the shaping ratio needs to be increased by making the angle of incidence α' on the hologram mirror 12 larger than the angle of incidence α in the arrangement shown in FIG. 5.

Embodiment 2

Figure 7:
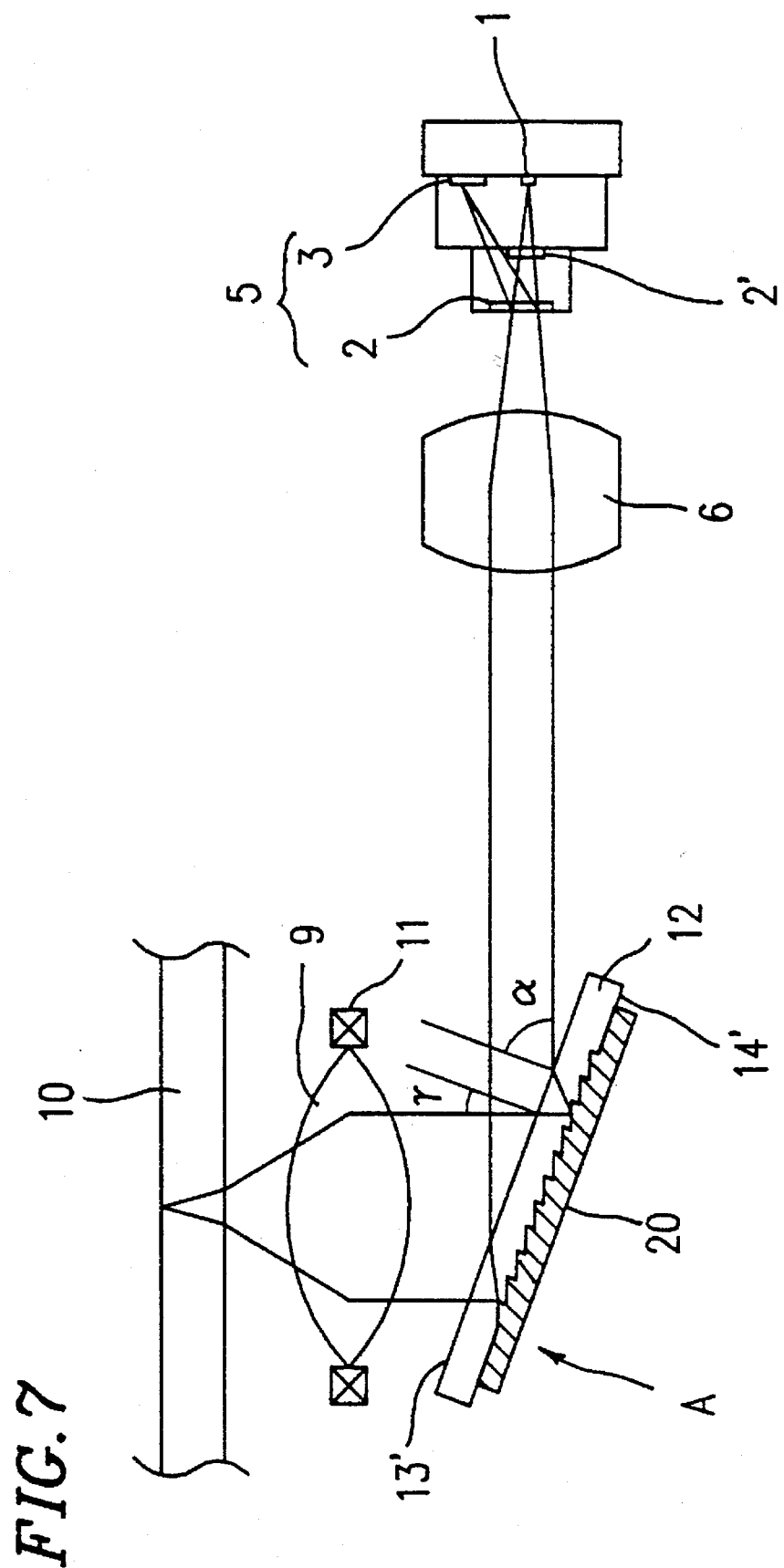
FIG. 7 is a schematic diagram showing the optical arrangement of an optical pickup according to a second embodiment of the invention.

FIG. 7 shows the construction of an optical pickup according to a second embodiment of the present invention. This embodiment differs from the foregoing first embodiment in that both the holographic optical element and the reflective film 20 are formed on the back surface of the substrate A of the hologram mirror 12. Otherwise, the optical arrangement is the same as that of the first embodiment, and description of the other component parts will not be repeated here.

The light beam emitted from the laser diode 1 and collimated by the collimator lens 6 is incident at an angle α on the front surface 13' of the substrate A of the hologram mirror 12. The incident light beam is transmitted through the substrate A and is incident on the blazed holographic optical element formed at grating pitch d on the back surface 14' of the substrate A. In this embodiment also, the holographic optical element is so designed that among all arising diffracted light beams the +1st order diffracted light beam is most intense, so that the +1st order diffracted light beam is directed to the objective lens 9. Therefore, the light beam incident from the front surface 13' of the substrate A is diffracted by the holographic optical element and reflected by the reflective film 20 formed on the holographic optical element, the beam then emerging from the front surface 13' at an angle γ for entrance into the objective lens 9. As in the first embodiment, the reflective film 20 is formed from a known metal film (including a multilayer film), such as Au and Al, to provide good reflection for the incident light beam.

In the above hologram mirror 12 where the holographic optical element is formed on the back surface 14' of the substrate A, since the diffraction efficiency of the holographic optical element is dependent on the groove shape of the holographic optical element viewed from the light incident side. Therefore, the reflective film 20 formed on the holographic optical element does not affect the diffraction efficiency of the holographic optical element. In other words, if the grooves of the holographic optical element, as viewed from the back surface 14' side, are filled with the reflective film 20, no ill effect will be caused to the diffraction efficiency of the holographic optical element.

Therefore, as in the first embodiment, in the second embodiment also, the groove shape of the holographic optical element that governs the diffraction characteristic remains unchanged despite the presence of the reflective film 20, and no degradation of the characteristics occurs due to the presence thereof. This also eases the dimensional accuracy of the reflective film 20, making its fabrication easier. Furthermore, the second embodiment has the advantage that deterioration of the holographic optical element is suppressed since the grooves of the holographic optical element are protected by the reflective film 20.

Also, compared with a 45-degree mirror, the thickness of the hologram mirror 12 measured in the direction perpendicular to the disk surface is reduced by a factor corresponding to sin γ. In this case, sin γ is expressed by the following equation, using the angle of incidence α, the angle of emergence γ, and the grating pitch d.

$$\sin \gamma = \sin \alpha - \lambda/d \qquad (3)$$

Next, a specific numerical example of the second embodiment will be described. The following description assumes the arrangement wherein the angle obtained by adding the angle of incidence α on the hologram mirror 12 to the angle of emergence γ from the hologram mirror 12 is 90 degrees.

Assuming that the wavelength of a light beam from the laser diode 1 is 0.78 μm, and the ellipticity of the light beam collimated by the collimator lens 6 is 1:3, if the light beam is to be shaped by enlarging its cross-sectional light intensity distribution into a circular form, the beam shaping rate at the hologram mirror 12 needs to be a factor of 3. As a result, the tilt angle θ of the hologram mirror 12 with respect to the optical axis of the incident light is $$\theta = \tan^{-1}(1/3) = 18.4 \text{ degrees.}$$

From this, the angle of incidence α is 71.6 degrees, and since α+γ=90 degrees, γ=18.4 degrees. Therefore, from Equation (3), the grating pitch d is 1.23 μm. Furthermore, compared with a 45-degree titled mirror, the thickness of the hologram mirror 12 measured in the direction perpendicular to the disk surface is reduced to one-third or less since sin (18.4°)=0.316.

The hologram pattern of the holographic optical element in the present embodiment is also designed as in the first embodiment. That is, the hologram pattern may be a grating of straight lines with pitch d as shown in FIG. 3A or a grating of substantially straight lines with pitch d', having a function of correcting the astigmatism, as shown in FIG. 3B.

Embodiment 3

Figure 8:
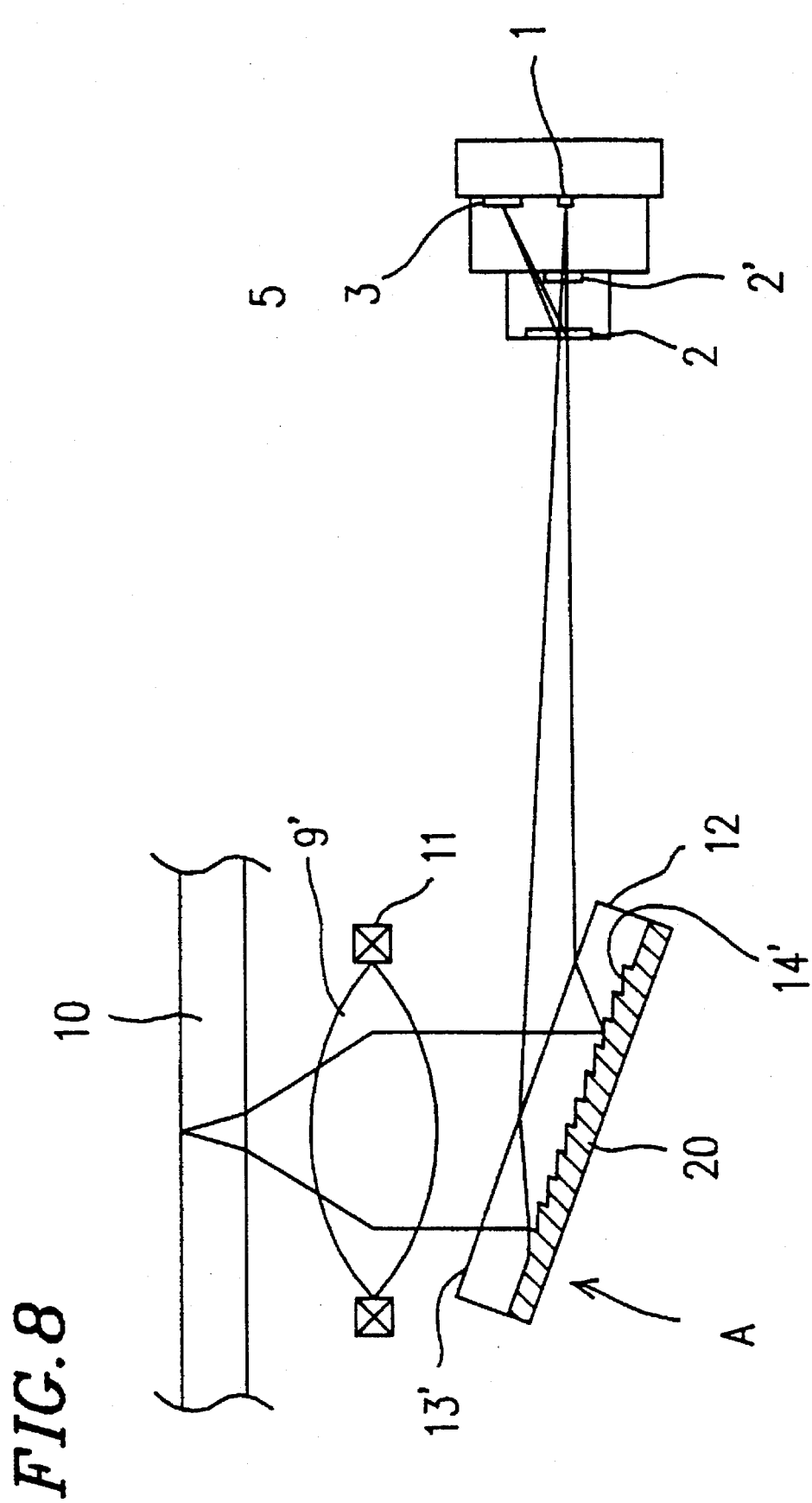
FIG. 8 is a schematic diagram showing the optical arrangement of an optical pickup according to a third embodiment of the invention.
Figure 9:
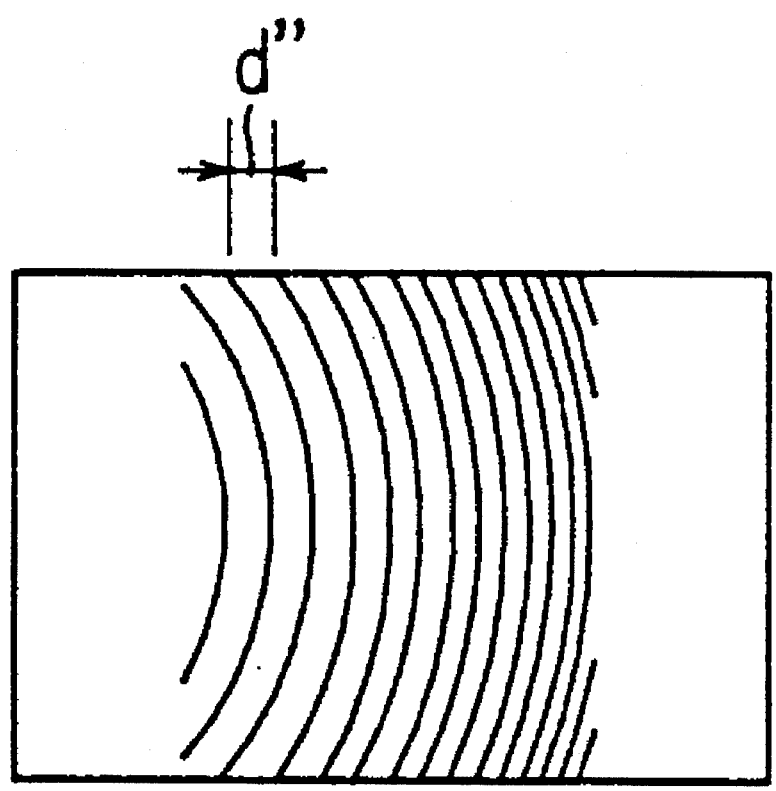
FIG. 9 is a schematic diagram showing a hologram pattern for the holographic optical element.

FIG. 8 is a schematic diagram showing the construction of an optical pickup according to a third embodiment of the present invention. This embodiment differs from the foregoing second embodiment in that the collimator lens is omitted so that the objective lens 9' is constructed as a finite system. In correspondence, the hologram pattern employed for the holographic optical element formed on the hologram mirror 12 has a gradually varying grating pitch d" as shown in FIG. 9. Otherwise, the optical arrangement is the same as that of the second embodiment.

The third embodiment not only offers the same effect as obtained in the second embodiment, but also provides the additional advantage that the cost of the optical pickup can be reduced because of a reduction in the number of optical components.

Moreover, as in the third embodiment, the collimator lens 6 may be omitted from the arrangement of the foregoing first embodiment. In this case, the objective lens 9 in FIG. 1 is replaced with the objective lens 9' as mentioned above, and the holographic optical element having a grating in which the pitch varies gradually is employed.

In any of the above embodiments, the holographic optical element of the hologram mirror is formed as a relief type, i.e., the hologram grooves are directly formed on the substrate by etching, scribing, etc., but the holographic optical element used in the present invention is not limited to the illustrated type. For example, a holographic optical element of a volume type, such as one with a grating formed on a $LiNbO_3$ substrate by proton exchange or other method, may be used.

The recording medium, i.e. the disk, for which the optical pickup of the present invention is intended is not limited to the phase-difference type, such as a CD or a write-once or phase-change optical disk, from which information is detected by detecting the lightness or darkness or the presence or absence of pits on the disk surface. It will be appreciated that the present invention can also be applied to optical pickups used for recording and playing back magneto-optical disks.

For example, when applying the present invention to an optical pickup that can record and play back magneto-optical disks, the holographic optical element having a volume hologram, which is formed for example by proton exchange or other method and is capable of separating the polarized components having different polarizing directions of reflected light, will be used. In this case, a detector including an optical waveguide capable of separating and detecting the polarized components having different polarizing directions will be used as the photodetector.

Figure 10:
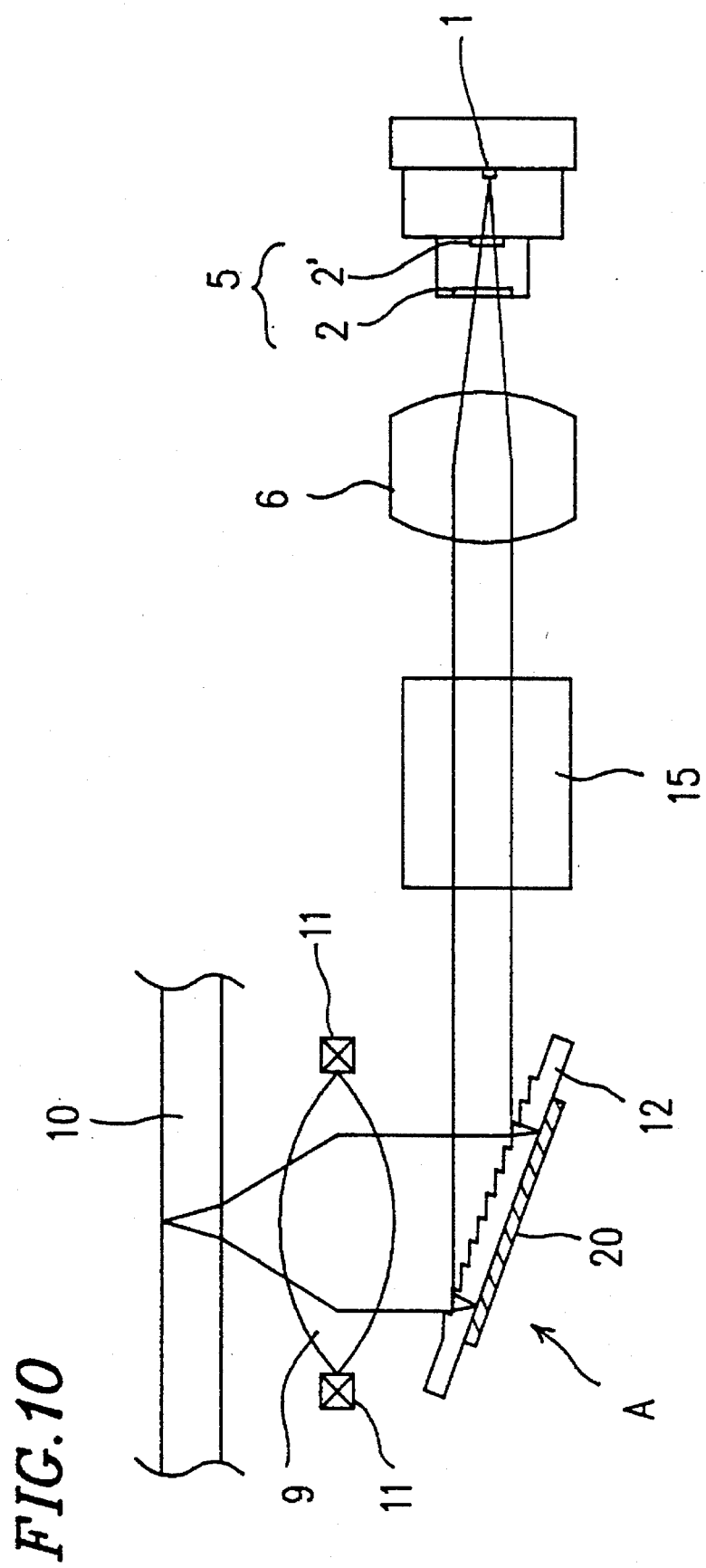
FIG. 10 is a schematic diagram showing a modified example of the optical arrangement when the optical pickup of the invention is applied to a magneto-optical disk drive.
Figure 11:
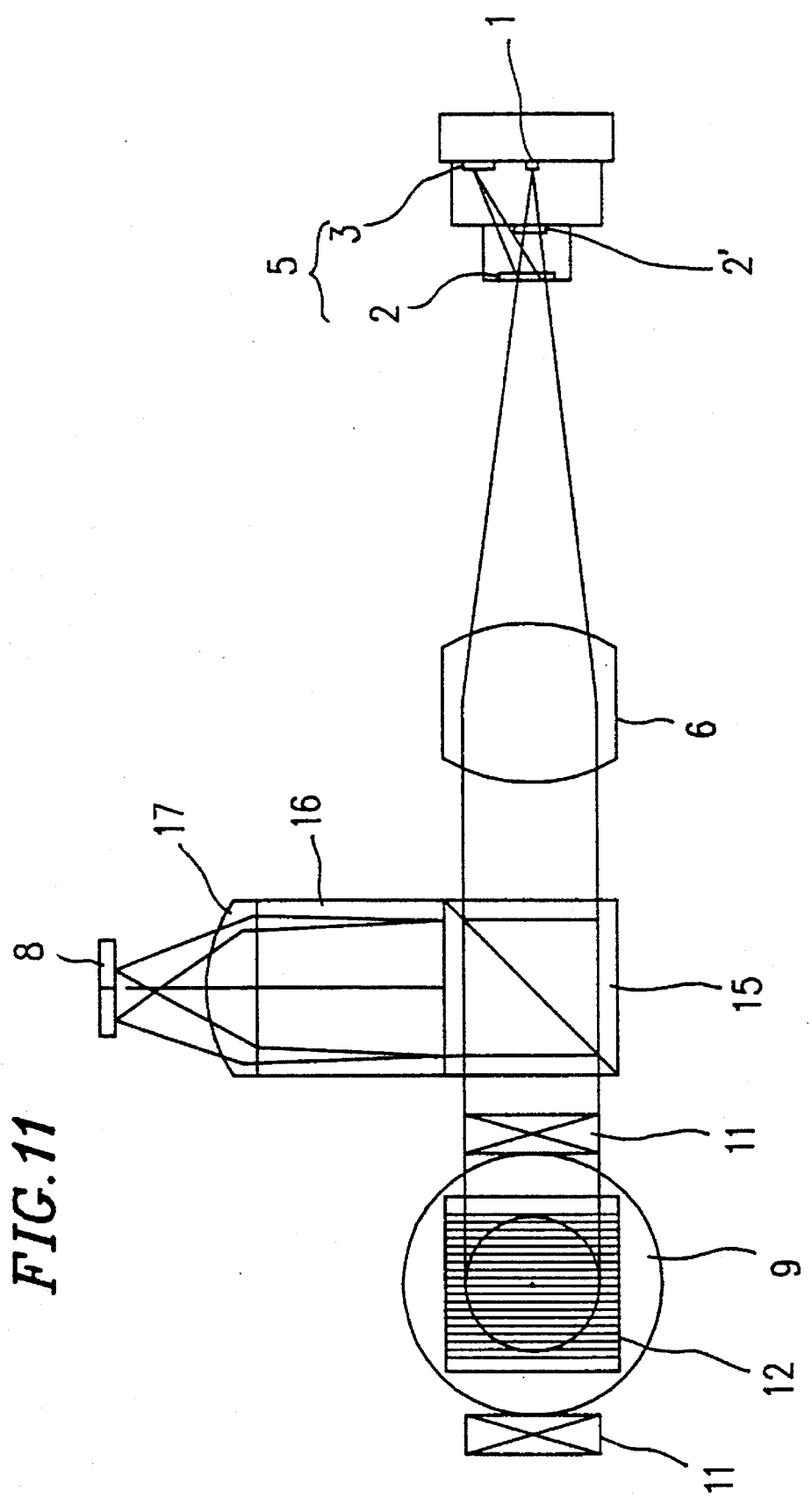
FIG. 11 is a plan view of the optical pickup of FIG. 10.

Alternatively, as shown in FIGS. 10 and 11, a polarizing beam splitter 15, a Wollaston prism 16, a plano-convex lens 17, and a photodetector 8, may be arranged between the collimator lens 6 and the hologram mirror 12 in the optical pickup shown in FIG. 1; in this case, the photodetector 8 is used to detect magneto-optical signals.

Furthermore, any of the above embodiments uses the HOE-LD-PD unit 5 in which the light source and photodetector are fabricated into a single unit, a construction advantageous for the reduction of size and weight of the optical pickup. However, it will be appreciated that the same effect as described in relation to the above embodiments can also be obtained if the light source and the photodetector are provided separately, not as a single unit.

In short, in the optical pickup of the present invention, it is only required that the optical component for bending the optical axis of the beam from the light source in the direction perpendicular to the disk surface be constructed from a hologram mirror whose holographic optical element is prevented from being affected by the presence of the reflective film, as described in each of the above embodiments. The parts other than the hologram mirror are not specifically limited in construction.

As described, in the optical pickup of the present invention, the transmissive holographic optical element is formed on the incident surface of the substrate of the hologram mirror, and the reflective film is formed on the opposite surface thereof. Alternatively, in another optical pickup of the present invention, both the holographic optical element and the reflective film are formed on the surface of the hologram mirror substrate opposite from the incident surface thereof. With either of these constructions, the groove shape of the holographic optical element that governs the diffraction characteristic is unaffected by the presence of the reflective film. This not only ensures the desired diffraction characteristic, but also makes the fabrication of the reflective film easier since the dimensional accuracy of the reflective film is eased. Furthermore, if deformation, etc. is caused to any portion of the surface of the reflective film because of deterioration of the reflective film with time, no ill effect will be caused to the diffraction characteristic. That is, excellent durability is provided.

Moreover, in the case where the transmissive holographic optical element is formed on the incident surface of the hologram mirror while the reflective film is formed on the other surface, incident light is diffracted twice to change its direction by the holographic optical element. Thus, the diffraction angle per diffraction can be made smaller than in the conventional hologram mirror, allowing the grating pitch of the holographic optical element to be increased. This also makes the fabrication of the holographic optical element easier. Furthermore, in the case where the reflective film is formed to cover the holographic optical element formed on the surface opposite to the incident surface of the hologram mirror, the grooves of the holographic optical element are protected by the reflective film. Therefore, the deterioration of the holographic optical element is suppressed, the durability is further improved.

If a hologram pattern so designed as to correct the astigmatism in the incident light is used for the holographic optical element, better beam focusing on the disk can be provided, which ensures good recording and playback of information. Furthermore, if a hologram pattern with a gradually varying grating pitch is used, the number of optical components can be reduced, which contributes to reducing the cost of the optical pickup.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup including a hologram mirror for directing an optical axis of a light beam emitted from a light source to be perpendicular to a recording face of a recording medium, the hologram mirror comprising:

a light transmissive substrate having a first surface and a second surface which are opposite to each other, the light beam from the light source entering the substrate from the first surface;

a transmissive holographic element, formed on the first surface, for diffracting the light beam incident thereon to generate a plurality of diffracted beams; and a reflective film, formed on the second surface of the substrate, for reflecting the diffracted beams, wherein the holographic element includes a blazed grating which is designed to make a predetermined one of the diffracted beams most intense.

2. An optical pickup according to claim 1, wherein the predetermined one of the diffracted beams reflected by the reflective film is diffracted by the blazed grating to be directed in a direction perpendicular to the recording face of the recording medium.

3. An optical pickup according to claim 1, wherein the blazed grating has a pattern for correcting astigmatism contained in the light beam.

4. An optical pickup according to claim 1, wherein the blazed grating is a grating of substantially straight lines.

5. An optical pickup according to claim 1, wherein a grating pitch of the blazed grating is gradually varied.

6. An optical pickup according to claim 1, wherein the predetermined one of the diffracted beams is the +1st order diffracted beam.

7. An optical pickup including a hologram mirror for directing an optical axis of a light beam emitted from a light source to be perpendicular to a recording face of a recording medium, the hologram mirror comprising:

a light transmissive substrate having a first surface and a second surface which are opposite to each other, the light beam from the light source entering the substrate from the first surface;

a holographic element, formed on the second surface, for diffracting the light beam which is transmitted from the first surface and is incident thereon to generate a plurality of diffracted beams; and a reflective film formed on the holographic element, wherein the holographic element includes a blazed grating which is designed to make a predetermined one of the diffracted beams most intense.

8. An optical pickup according to claim 7, wherein the blazed grating has a pattern for correcting astigmatism contained in the light beam.

9. An optical pickup according to claim 7, wherein the blazed grating is a grating of substantially straight lines.

10. An optical pickup according to claim 7, wherein a grating pitch of the blazed grating is gradually varied.

11. An optical pickup according to claim 7, wherein the predetermined one of the diffracted beams is the +1st order diffracted beam.

* * * * *